United States Patent [19]

Turin et al.

[11] Patent Number: 4,724,692
[45] Date of Patent: Feb. 16, 1988

[54] LOCKING QUICK RELEASE MECHANISM WITH FORCE INDICATING NUT

[75] Inventors: Paul S. Turin, Berkeley; Robert W. Dickinson, San Rafael, both of Calif.

[73] Assignee: Turn Engineering, Ltd., Oakland, Calif.

[21] Appl. No.: 5,914

[22] Filed: Jan. 21, 1987

[51] Int. Cl.$^4$ ............................................. B62H 5/14
[52] U.S. Cl. ....................................... 70/225; 70/233; 70/204
[58] Field of Search ................ 70/181, 204, 218, 222, 70/223, 225, 230, 233; 301/111, 114, 124 R, 125, 128

[56] References Cited

U.S. PATENT DOCUMENTS

| | | |
|---|---|---|
| 1,262,185 | 4/1918 | Drew . |
| 1,662,099 | 3/1928 | Anderson ............................ 70/204 |
| 1,921,434 | 8/1983 | Stone . |
| 2,055,289 | 9/1936 | Hena ................................. 70/223 |
| 2,464,152 | 3/1949 | Ralston . |
| 2,850,937 | 9/1958 | Ralston . |
| 3,589,234 | 6/1971 | Trigg . |
| 3,807,204 | 4/1974 | Cucheron . |
| 3,988,910 | 11/1976 | Widen . |
| 4,020,734 | 5/1977 | Bell . |
| 4,028,915 | 6/1977 | Stahl . |
| 4,072,081 | 2/1978 | Curtis . |
| 4,114,409 | 9/1978 | Scire . |
| 4,290,284 | 9/1981 | Nicksic . |
| 4,410,296 | 10/1983 | Unrug . |
| 4,411,549 | 10/1983 | Sheppard . |
| 4,571,133 | 2/1986 | Lindow . |
| 4,621,873 | 11/1986 | Weinstein . |

FOREIGN PATENT DOCUMENTS 141945 1/1935 Austria .................................. 70/233

Primary Examiner—Robert L. Wolfe
Attorney, Agent, or Firm—Flehr, Hohbach, Test, Albritton & Herbert

[57] ABSTRACT

Quick release mechanism which can be locked to prevent unauthorized removal of a bicycle wheel or other object secured thereby. The mechanism has an axially extending drawbar, a pair of clamping elements mounted on the drawbar for axial movement relative to each other between securing and released positions, an operating lever connected to the drawbar for moving the clamping elements between the securing and released positions, and a lock forming an integral part of the mechanism. In one embodiment, the operating lever is disconnected from the drawbar and locked in this position to prevent unauthorized removal of the object secured by the mechanism. In other embodiments, the operating lever is locked to prevent unauthorized release of the mechanism. A force indicating nut employed as one of the clamping elements indicates when the mechanism is adjusted for the proper tension to retain the mechanism in the secured position.

17 Claims, 10 Drawing Figures

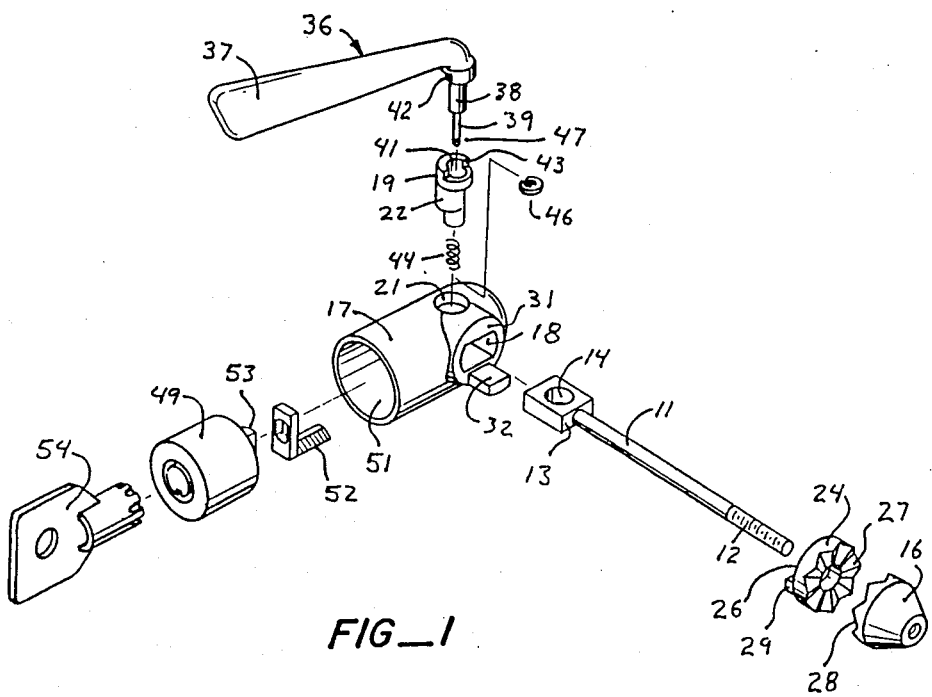
FIG_1
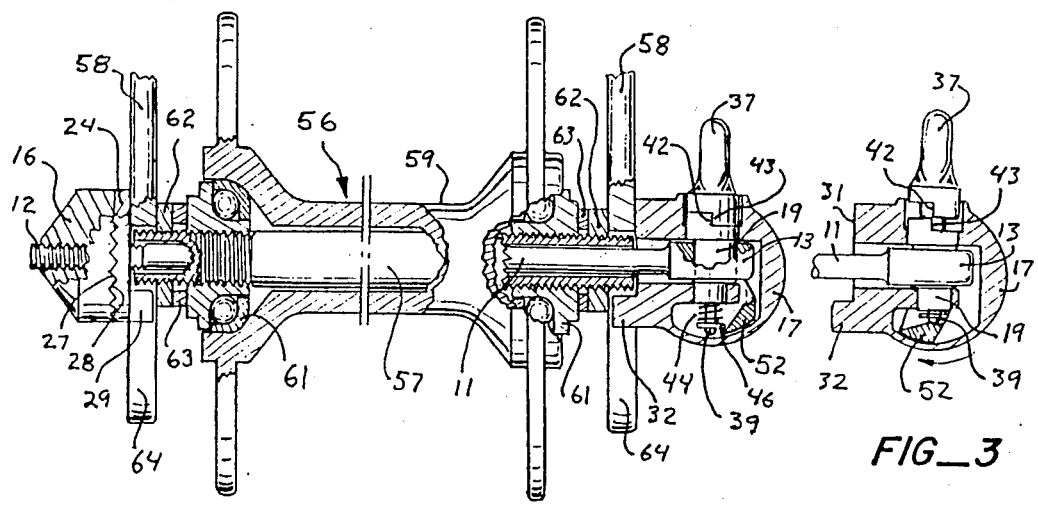
FIG_2
FIG_3

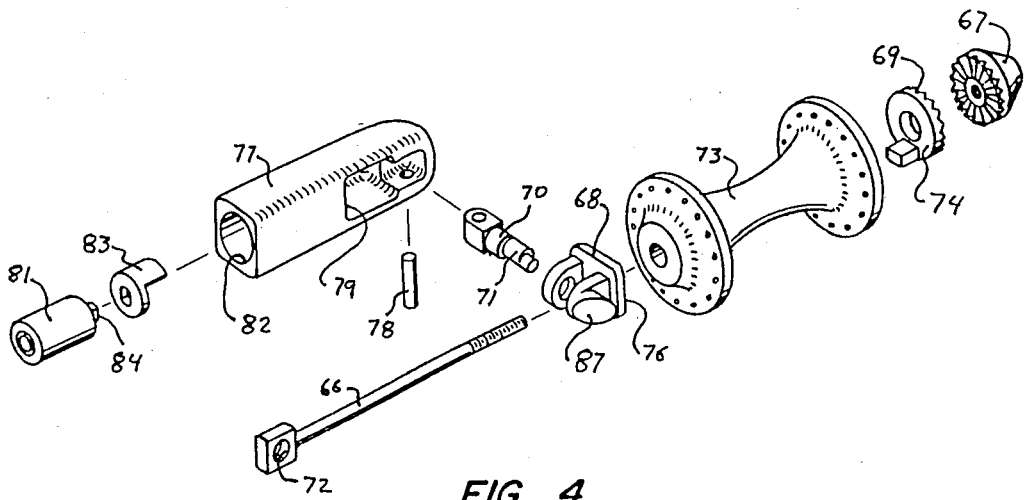
FIG_4
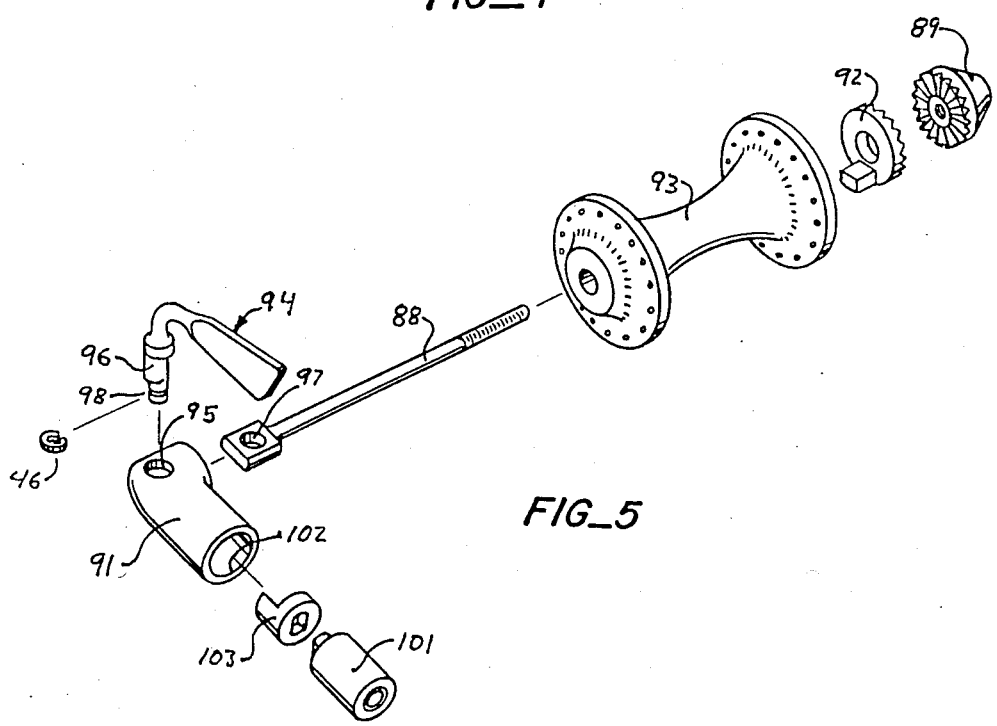
FIG_5

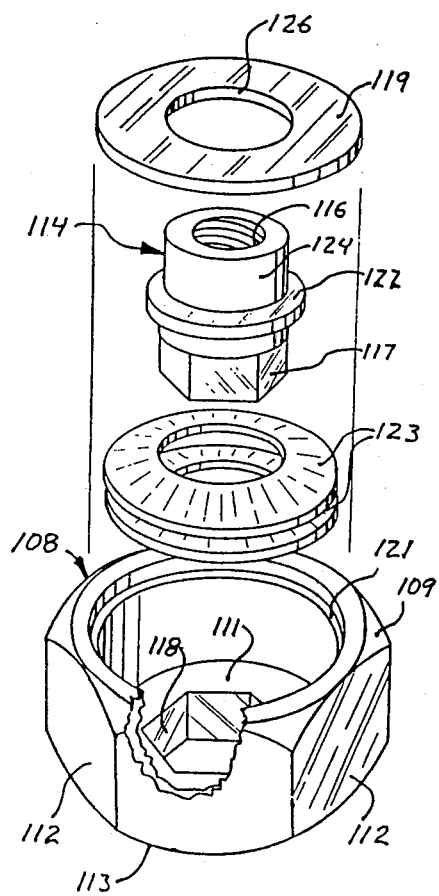
FIG_6
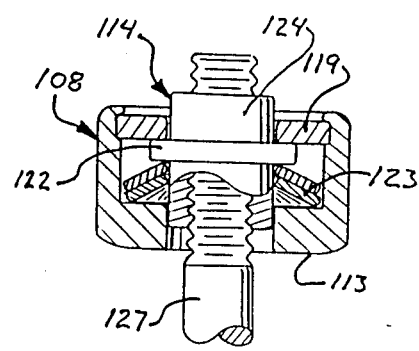
FIG_7
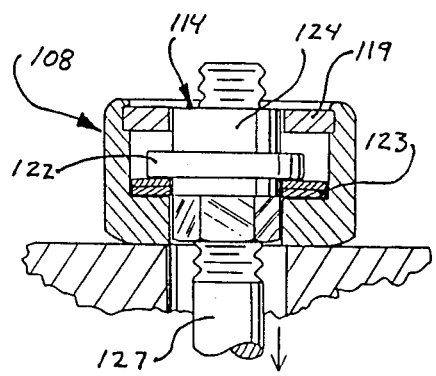
FIG_8
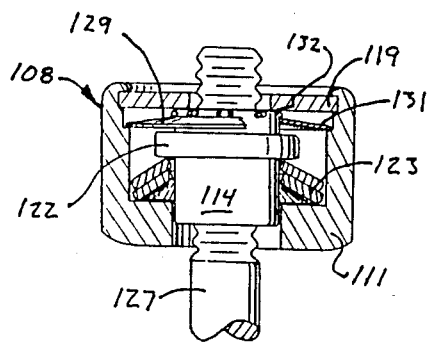
FIG_9
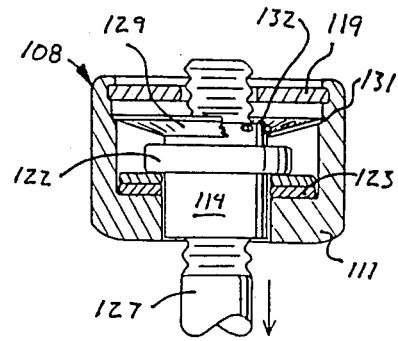
FIG_10

LOCKING QUICK RELEASE MECHANISM WITH FORCE INDICATING NUT

This invention pertains generally to quick release mechanisms as utilized, for example, to secure wheels to bicycles, and more particularly to a quick release mechanism which can be locked to prevent unauthorized removal of the wheel or other object secured thereby.

Quick release mechanisms permit the wheels of bicycles to be removed for convenience in transportation and storage, but they are also conducive to theft unless other measures are taken to secure the wheels against such unauthorized removal. Thus, when bicycles are left in racks, the front wheels are commonly removed and chained or otherwise locked to the frames of the bicycles and/or the racks.

With quick release mechanisms, there is also a problem in determining when the mechanism is adjusted tightly enough to hold an object in the secured position but not so tight as to interfere with the operation of the release mechanism.

U.S. Pat. No. 4,028,915 discloses an attachable lock which can be applied to a quick release mechanism to prevent movement of the operating lever of the mechanism. To unlock the lever, the lock attachment must be removed from the release mechanism and carried separately.

U.S. Pat. No. 4,114,409 discloses a lock attachment which locks the wheel to the fork of the bicycle through the quick release mechanism yet allows the mechanism to operate in its normal fashion even though the wheel cannot be removed from the frame.

It is in general an object of the invention to provide a new and improved quick release mechanism which prevents unauthorized removal of bicycle wheels and other objects secured thereby.

Another object of the invention is to provide a quick release mechanism of the above character which includes means for determining when the mechanism is adjusted to provide the proper degree of holding force in the secured position.

These and other objects are achieved in accordance with the invention by providing a quick release mechanism having an axially extending drawbar, a pair of clamping elements mounted on the drawbar for axial movement relative to each other between securing and released positions, an operating lever connected to the drawbar for moving the clamping elements between the securing and released positions, and a lock forming an integral part of the mechanism. In one embodiment, the operating lever is disconnected from the drawbar and locked in this position to prevent unauthorized removal of the object secured by the mechanism. In other embodiments, the operating lever is locked to prevent unauthorized release of the mechanism. A force indicating nut employed as one of the clamping elements indicates when the mechanism is adjusted for the proper tension to retain the mechanism in the secured position.

FIG. 1 is an exploded perspective view of one embodiment of a quick release mechanism according to the invention.

FIG. 2 is a front elevational view, partly broken away, of a bicycle wheel hub assembly with the quick release mechanism of FIG. 1.

FIG. 3 is a fragmentary view, similar to a portion of FIG. 2, illustrating the release mechanism in its locked position.

FIGS. 4 and 5 are exploded perspective views of additional embodiments of a quick release mechanism according to the invention.

FIG. 6 is an exploded perspective view, partly broken away, of one embodiment of a force indicating nut according to the invention.

FIGS. 7 and 8 cross-sectional views, partly broken away, illustrating the embodiment of FIG. 6 in two different operating positions.

FIG. 9 is a cross-sectional view, partly broken away, of another embodiment of a force indicating nut according to the invention.

FIG. 10 is a cross-sectional view similar to FIG. 9 showing the force indicating nut in a second operating position.

As illustrated in FIG. 1, the quick release mechanism includes a drawbar 11 adapted to extend axially through a hollow shaft such as the front axle of a bicycle (not shown). One end of the drawbar has an external thread 12, and the other has an enlarged head 13 of generally rectangular cross-section with a transverse bore 14.

A pair of clamping elements are mounted on the drawbar for axial movement relative to each other between securing and released positions. In the embodiment of FIG. 1, one of the clamping elements comprises a nut 16 mounted on the threaded end of the drawbar, and the other clamping element comprises a lock housing 17 having a generally rectangular bore 18 in which the head 13 of the drawbar is slidably received. The lock housing is connected to the drawbar by a cam member 19 rotatively mounted in a bore 21 generally perpendicular to bore 18, with an eccentric portion 22 of the cam member being received in bore 14 in the head of the drawbar. Rotation of the cam member changes the distance between nut 16 and lock housing 17 to move the mechanism between securing and released positions.

Means is provided for preventing rotation of nut 16 when the mechanism is in the secured position. This means includes a lock washer 24 mounted on drawbar 11 adjacent to the nut. The lock washer has a generally planar surface 26 on one side thereof for bearing against an object (not shown) such as the fork of a bicycle and a knurled axial face 27 on the other side for engagement with a corresponding surface 28 on the nut. The knurled surfaces lock the washer and the nut together from the standpoint of rotation, and an axially projecting lug 29 on the washer is adapted to be received in the axle mounting slot in a bicycle fork to prevent rotation of the nut and washer. If desired, the inner surface 26 of the lock washer can also be knurled or textured to grip the fork or another object on which the mechanism is installed.

Lock housing 17 has an axially facing bearing surface 31, and rotation of the lock housing is prevented by a lug 32 which projects in an axial direction from surface 31 and is adapted to be received in the axle mounting slot of a bicycle fork.

Nut 16 is illustrated as having a generally conical contour which would make gripping and removal of the nut very difficult when the mechanism is in its secured position even if lock washer 24 were not employed. With the lock washer, however, the conical contour is not necessary, and the nut can have any other suitable contour. The nut can also be of the force indicating type illustrated in FIGS. 6–10.

Cam member 19 is rotated by means of an operating lever 36 which has a lever arm 37 and a shaft 38 which a stem 39 of reduced diameter projecting from the free end of the shaft. Shaft 38 is rotatively mounted in an axial bore 41 in the cam member, and radial shoulders 42, 43 on the operating lever and the cam provide a driving connection between these two elements. The driving surfaces can be separated to disconnect the operating lever from the cam member by axial movement of the operating lever relative to the cam member. Surfaces 42 and 43 are urged into driving engagement by a coil spring 44 mounted on stem 39 between the lower face of the cam member and an E-ring 46 mounted in a groove 47 in the stem.

A lock cylinder 49 is mounted in a third bore 51 in lock housing 17. This bore is generally perpendicular to bores 18, 21. An L-shaped cam member 52 is connected to the output shaft 53 of the lock cylinder for rotation of about the axis of bore 51 as the cylinder is locked and unlocked by a key 54. In the unlocked position, cam member 52 is positioned to the side of operating lever stem 39, and spring 44 urges the operating lever and cam member 19 into driving engagement. In the locked position, cam member 52 engages the lower end of stem 39 and lifts the operating lever to separate the driving surfaces, as illustrated in FIG. 3, thereby disconnecting the operating lever from cam member 19. With the operating lever disconnected, the quick release mechanism cannot be released, and the bicycle wheel or other object secured by mechanism is protected from theft or unauthorized removal.

In FIG. 2, the quick release mechanism of FIG. 1 is illustrated in connection with the hub assembly 56 of the front wheel of a bicycle. This assembly includes an externally threaded hollow axle 57 which extends between the arms 58 of the front fork of the bicycle. Wheel hub 59 is rotatively mounted on the axle by means of ball bearings 61, the inner races of which are threadedly mounted on the axle to permit proper preloading of the bearings. The hub and bearings are retained in position on the axle by nuts 62 and washers 63 which are tightened against the inner races of the bearings.

Drawbar 11 extends through axle 56 with the bearing surfaces of lock housing 17 and lock washer 24 engaging the outer surfaces of fork arms 58. Lugs 29, 32 are received in the slotted openings 64 of the fork arms to prevent rotation of clamping nut 16 and lock housing 17.

When the wheel is first installed, the position of nut 16 on drawbar 11 is adjusted so that when the mechanism is in its secured position fork arms 58 will be clamped securely between nuts 62 and the clamping elements on the drawbar. The assembly is secured to the fork by rotating lever arm 37 to turn cam member 19 and draw the clamping elements together against the fork arms. When the release mechanism is secured, lock 49 is locked to disengage the driving surfaces of operating lever 36 and cam member 19, thereby preventing unauthorized removal of the wheel. The bicycle can be operated with the mechanism locked in this manner, and since the wheel is securely locked to the frame, there is no need to remove the wheel or otherwise secure it when the bicycle is left unattended or in a rack.

In the embodiment of FIG. 4, the quick release mechanism has a drawbar 66 similar to drawbar 11. The clamping elements in this embodiment comprise a nut 67 threadedly mounted on one end of the drawbar and a cam yoke 68 toward the other end of the drawbar. A lock washer 69 similar to lock washer 24 prevents rotation of nut 67, and an axially projecting lug (not shown) on cam yoke 68 prevents rotation of the cam yoke. A cam member 70 is rotatively mounted in the yoke, with the eccentric portion 71 of the cam being received in a bore 72 in the head of the drawbar. Drawbar 66 extends axially through the hub 73 of a bicycle wheel, and lock washer 69 and yoke 68 have axially facing surfaces 74, 76 which bear against the arms of the bicycle fork when the wheel is secured to the fork.

Cam member 70 is rotated about its axis by means of an operating lever 77 to secure and release the mechanism. The operating lever is pivotally connected to the cam member by means of a pin 78 for movement between an operating position and a locked position. In the operating position, lever 77 is generally perpendicular to the axis of cam member 70, and in the locked position, the operating lever is folded over the cam member and yoke and is generally parallel to the axis of the cam member. The operating lever has a recessed area or cavity 79 in which the cam member and yoke are received when the lever is in the locked position, thereby preventing rotation of the cam member.

A lock cylinder 81 is mounted in an axial bore 82 in operating lever 77. A lock tang 83 is affixed to the output shaft 84 of the cylinder by a screw 86 for rotation about the axis of bore 82 upon actuation of the cylinder. When operating lever 77 is folded over yoke 68, tang 83 is rotated into engagement with a boss 87 on yoke 68 to lock the lever to the yoke and secure the lever in this position. With the operating lever thus locked, cam member 70 cannot be rotated, and the mechanism cannot be released until the cylinder is unlocked. With the cylinder unlocked, tang 83 is free of the yoke, and the operating lever can be swung into position to rotate cam member 70 to release the mechanism.

In the embodiment of FIG. 5, the quick release mechanism has a drawbar 88 similar to drawbar 11. The clamping elements in this embodiment comprise a nut 89 threadedly mounted on one end of the drawbar and a lock housing 91 similar to lock housing 17. A lock washer 92 similar to lock washer 24 prevents rotation of nut 89, and rotation of the lock housing is prevented by the axially projecting lug (not shown) on that housing. Drawbar 88 extends axially through the hub 93 of a bicycle wheel, and the axial faces of nut 89 and lock housing 91 bear against the fork of the bicycle to secure the wheel to the fork as in the previous embodiments.

An operating lever 94 is rotatively mounted in a bore 95 in lock housing 91 for rotation about an axis perpendicular to the axis of drawbar 88. The shaft of the operating lever includes an eccentric portion or cam 96 which is received in a transverse bore 97 in the head of drawbar 88. The operating lever is retained in the lock housing by a threaded stem 98 at the lower end of the shaft which is received in a threaded bore (not shown) in the lock housing.

As in the previous embodiments, the mechanism is moved between securing and released positions by rotation of operating lever 94. As the operating lever is rotated, cam 96 causes drawbar 88 to advance and retract relative to housing 91. In the securing position, nut 89 and housing 91 are drawn together, and in the released position the nut and housing are separated axially.

A key actuated lock cylinder 101 is mounted in a bore 102 in the lock housing, with a lock tang 103 mounted on the output shaft of the cylinder for rotation about the axis of bore 102. The tang is engageable with operating arm 94 to prevent rotation of the arm when the mechanism is in its secured position. Alternatively, the tang can engage the head of drawbar 88 to lock the mechanism in the secured position.

While the embodiments of FIGS. 1-5 have been disclosed with specific reference to use with bicycle wheels, these quick release mechanisms can be used in other applications as well. For example, they can be used to secure bicycle seats to the frames of bicycles and they can also be used to secure bicycles to car racks. In this latter application, the front wheel of the bicycle is removed, and the front fork of the bicycle is secured to the rack by the release mechanism in the same manner that the wheel is secured.

FIG. 6 illustrates one embodiment of a nut which can be employed in the quick release mechanisms of FIGS. 1-5. This nut has a cup-shaped housing or body 108 with a side wall 109 and an end wall 111. Side wall 109 has a hexagonal outer contour with opposing flat surfaces 112 adapted for engagement by a wrench, and end wall 111 has an axially facing outer bearing surface 113 for engagement with an object to be held by the nut. A core member 114 is positioned coaxially within housing 108 and adapted to be threadedly mounted on a bolt (not shown). The core member has a threaded bore 116 for engagement with the bolt. The core member has an inner end portion 117 of hexagonal contour which is slidably received in a bore 118 of similar contour in the bottom wall of the housing to lock the core member and housing together for rotation while permitting the core member to move axially with respect to the housing.

The core member is retained in the housing by an annular end plate or washer 119. The end plate is seated on an annular shoulder 121 in the housing, and the upper portion of the side wall of the housing is rolled over to secure the end plate to the housing. The core member has a radial flange 122 which abuts against the inner surface of the end plate.

The core member is urged toward end plate 119 by a pair of conical spring washers 123, commonly known as Bellville washers. The outer portions of these washers bear against bottom wall 111, and the inner portions of these washers bear against flange 122. These washers have the property that they retain their conical shape as long as the axial force applied to them is below a predetermined level. When the force reaches or exceeds the predetermined level, the washers become flattened. In a quick release mechanism, the washers are selected to change shape when the proper force for securing the mechanism is applied by the drawbar.

The outer portion 124 of core member 114 projects through an opening 126 in end plate 119 and is thus visible externally of the housing to indicate the force applied to the nut.

Operation and use of the nut illustrated in FIG. 6 are best understood with reference to FIGS. 7 and 8 where the nut is shown in connection with a bolt 127. FIG. 7 illustrates the nut in its untightened state with washers 123 uncompressed and the outer portion 124 of core member 114 projecting beyond end plate 119. As the nut is rotated on bolt 127 and bearing surface 113 engages the object to be held, the core member remains in its extended position as long as the tensive force in the bolt is below the level required to compress washers 123. When the force reaches the level required to compress the washers, the core member moves to its retracted position, providing a visual indication that this force level has been reached.

The embodiment of the force indicating nut illustrated in FIGS. 9-10 provides an audible indication when the applied force reaches a predetermined level. This embodiment is generally similar to the embodiment of FIG. 6, and like reference numerals designate corresponding elements in the two embodiments. In the embodiment of FIGS. 9-10, the core member does not project out of the housing, and the movement of the core member is limited by abutment of the outer end of the member against the inner surface of end plate 119. This embodiment also has an additional conical spring washer 129 mounted between housing 108 and core member 114. The outer portion of this washer bears against an annular shoulder 131 on the side wall of the housing, the inner portion of this washer is retained on the core member by radially projecting stakes 132.

As the tensive force in bolt 127 reaches the level required to compress washers 123, washer 129 snaps from its normal position to an inverted position, producing an audible clicking sound to indicate that the nut has been tightened to the proper degree.

It is apparent from the foregoing that a new and improved quick release mechanism and force indicating nut have been provided. While only certain presently preferred embodiments have been described in detail, as will be apparent to those familiar with the art, certain changes and modifications can be made without departing from the scope of the invention as defined by the following claims.

We claim:

1. In a quick release mechanism: an axially extending drawbar, first and second clamping elements mounted on the drawbar and being axially movable relative to each other between securing and released positions, an operating lever connected to the drawbar for moving the clamping elements between the securing and released positions, and locking means for disconnecting the operating lever from the drawbar to prevent movement of the clamping elements from the securing position to the released position.

2. The mechanism of claim 1 wherein the first clamping element comprises a nut threadedly mounted on one end of the drawbar.

3. The mechanism of claim 2 including a lock washer having a lug for preventing rotation of the lock washer and a knurled axial face engageable with a similar face on the nut for preventing rotation of the nut when the clamping elements are in the securing position.

4. The mechanism of claim 2 wherein the nut includes means responsive to tensive force in the drawbar for indicating when the force reaches a predetermined level.

5. The mechanism of claim 1 wherein the operating lever is connected to the drawbar by means of a cam member rotatively mounted in the drawbar and the second clamping element for effecting relative axial movement between the drawbar and the second clamping element.

6. The mechanism of claim 5 wherein the operating lever has a shaft rotatively mounted in an axial bore in the cam member, with separable driving surfaces on the operating lever and the cam member for transmitting rotative motion from the operating lever to the cam member, and means yieldably urging the driving surfaces into driving engagement with each other.

7. The mechanism of claim 6 wherein the locking means includes means for separating the driving surfaces on the operating lever and the cam member.

8. The mechanism of claim 1 wherein the second clamping element comprises a lock housing having a first bore in which the drawbar is slidably received and second and third bores generally perpendicular to the first bore, a cam member rotatively mounted in the second bore with an eccentric portion received in a radial bore in the drawbar, means rotatively mounting the operating lever in the second bore with separable driving surfaces on the operating lever and the cam member for transmitting rotative motion from the operating lever to the cam member, and means yieldably urging the driving surfaces into driving engagement with each other, the locking means including a lock cylinder mounted in the third bore with means actuated by the cylinder for separating the driving surfaces.

9. The mechanism of claim 8 wherein the operating lever includes a shaft portion on which the cam member is rotatively and axially movable, and the driving surfaces comprise radial faces which are engaged and separated by relative axial movement of the cam member and the lever shaft.

10. The mechanism of claim 2 wherein the nut comprises a first member having an axially facing surface adapted to bear against an object to be held, a second member threadedly mounted on the drawbar, said first and second members being movable axially of each other between first and second positions, means for holding the two members in the first position when tensive force in the drawbar is below a predetermined level and permitting the two members to move to the second position when the tensive force reaches the predetermined level, and means for indicating when the two members are in the second position.

11. The nut of claim 10 wherein the means for indicating when the two members are in the second position includes a visually observable portion of one of the members.

12. The nut of claim 10 wherein the means for indicating when the two members are in the second position includes means for emitting an audible sound as the members move to the second position.

13. The mechanism of claim 2 wherein the nut comprises a cup-shaped housing having an end wall with an axially facing outer surface for bearing against an object to be held, an internally threaded core positioned coaxially within the housing and threadedly mounted on the drawbar for movement toward the end wall upon rotation of the bolt, and a conical spring washer positioned between the core and the end wall of the housing for holding the core away from the end wall when the axial force applied to the washer is below a predetermined level and permitting the core to move toward the end wall when the force reaches the predetermined level.

14. The nut of claim 13 wherein a portion of the core is visible externally of the housing, and the position of this portion can be observed to determine when the force applied to the washer reaches the predetermined level.

15. The nut of claim 13 including a second spring washer connected between the core and housing and adapted to snap between first and second positions as the core moves toward the end wall of the housing.

16. The nut of claim 13 wherein the housing has a hexagonal outer side wall with opposing flat surfaces adapted to be engaged by a wrench, and the core is constrained against rotation relative to the housing.

17. The nut of claim 16 wherein the core has a non-circular cross-sectional contour and is slidably mounted in a bore of corresponding contour in the housing.

* * * * *